United States Patent [19]

Ball et al.

[11] Patent Number: 4,653,584

[45] Date of Patent: Mar. 31, 1987

[54] MALEIMIDE-MODIFIED BIORESISTANT POLYMERS AND ENHANCED OIL RECOVERY METHOD EMPLOYING SAME

[75] Inventors: Lawrence E. Ball, Akron; William M. Griffin, Chesterland; Kathleen M. Antloga, Chardon; Amy L. Nemecek, Garfield Hts., all of Ohio

[73] Assignee: The Standard Oil Company, Cleveland, Ohio

[21] Appl. No.: 739,480

[22] Filed: May 30, 1985

[51] Int. Cl.$^4$ .............................................. E21B 43/22
[52] U.S. Cl. ................................. 166/273; 252/8.551; 526/262
[58] Field of Search ................... 252/855 D; 526/262; 166/274, 273

[56] References Cited

U.S. PATENT DOCUMENTS

| | | | |
|---|---|---|---|
| 2,205,558 | 6/1940 | Flett | 167/33 |
| 2,827,964 | 3/1958 | Sandiford et al. | 166/9 |
| 3,079,336 | 2/1963 | Stright et al. | 252/8.55 |
| 3,343,601 | 9/1967 | Pye | 252/8.55 X |
| 3,394,145 | 7/1968 | Bublitz | 260/326.5 |
| 3,407,204 | 10/1968 | Shay et al. | 260/286 |
| 3,562,157 | 2/1971 | Hoover | 252/8.55 |
| 3,804,173 | 4/1974 | Jennings | 252/8.55 X |
| 3,811,504 | 5/1974 | Flournoy et al. | 252/8.55 X |
| 3,853,802 | 12/1974 | Norton et al. | 260/29.6 WB |
| 3,923,490 | 12/1975 | Redmore | 71/67 |
| 3,997,293 | 12/1976 | Redmore | 21/2.5 A |
| 4,049,559 | 9/1977 | Grier et al. | 252/8.55 D |
| 4,249,608 | 2/1981 | Carter | 166/275 |
| 4,284,517 | 8/1981 | Chen et al. | 252/8.55 |
| 4,326,969 | 4/1982 | Hunter | 252/8.55 D |
| 4,518,755 | 5/1985 | Locatelli et al. | 526/262 |

*Primary Examiner*—Herbert B. Guynn
*Attorney, Agent, or Firm*—L. W. Evans; D. J. Untener; W. A. Heidrich

[57] ABSTRACT

A polymer is disclosed which is represented by the formula

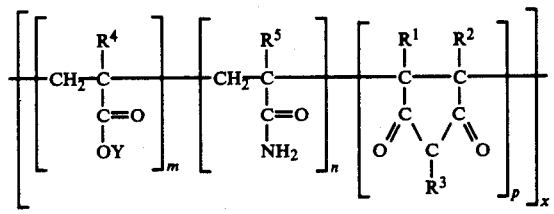

wherein: Y is hydrogen, ammonium, an alkali metal or an alkaline earth metal; $R^1$ and $R^2$ are independently hydrogen, hydroxyl, amino, nitro, sulfo, phospho, carboxy, carboxyamido groups or hydrocarbon groups of 1 to about 20 carbon atoms; $R^3$ is hydrogen or a hydrocarbon group of from 1 to about 12 carbon atoms; $R^4$ and $R^5$ are independently hydrogen or alkyl groups of 1 to about 3 carbon atoms; m is a number sufficient to provide the acid or salt portion of said polymer at a level of from zero to about 90% by weight of the total weight of said polymer; n is a number sufficient to provide the amide portion of said polymer at a level of from about 10% to about 99.5% by weight of the total weight of said polymer; p is a number sufficient to provide the maleimide portion of said polymer at a level of at least about 0.2% by weight of the total weight of said polymer; and x is a number sufficient to provide said polymer with a molecular weight of at least about 100,000. A method for recovering oil from a subterranean formation comprising injecting into said formation an aqueous composition comprising a thickening amount of the foregoing polymer is also disclosed.

31 Claims, No Drawings

MALEIMIDE-MODIFIED BIORESISTANT POLYMERS AND ENHANCED OIL RECOVERY METHOD EMPLOYING SAME

TECHNICAL FIELD

This invention relates to novel bioresistant polymers and to the recovery of oil from subterranean formations using said polymers. More particularly, this invention relates to maleimide modified bioresistant, water-soluble polymers and their use as thickeners in enhanced oil recovery waterflooding operations.

BACKGROUND OF THE INVENTION

In the recovery of oil from oil-bearing subterranean formations, it usually is possible to recover only minor portions of the original oil in place by the so-called primary recovery methods which utilize only the natural forces present in the formation. A variety of supplemental recovery techniques have been employed in order to increase the recovery of oil from subterranean formations. The most widely used supplemental recovery technique is waterflooding which involves the injection of water into the formation. As the water moves through the formation, it acts to drive oil therein toward a production system composed of one or more wells through which the oil is recovered.

It has long been recognized that factors such as the relative mobilities of the oil in the formation and injected water influence the amount of oil recovered by waterflooding. Viscosifiers such as polymeric thickeners are commonly added to all or part of the injected water in order to increase the viscosity thereof, thus decreasing the mobility ratio between the injected water and oil and improving the sweep efficiency of the waterflood. Examples of such polymeric thickeners include the polyacrylamides and partially hydrolyzed polyacrylamides. See, for example, U.S. Pat. Nos. 2,827,964; 3,039,529; 3,853,802; 4,249,608; 4,326,969; and 4,409,110. Examples of commercially available hydrolyzed polyacrylamides that are useful as thickeners for waterflooding are the "Pusher" chemicals marketed by the Dow Chemical Company.

A significant problem with respect to many of the commercially available polymeric thickeners relates to their lack of resistance to attack by microorganisms that grow in the floodwater and possibly in the subterranean formation. These microorganisms use the polymeric thickeners as food and thereby destroy their useful properties. Thus far the solution to this problem has been to add a biocide additive to the floodwater to prevent the growth of such microorganisms. Examples of such additives include formaldehyde and glutaraldehyde. The patent literature suggests other additives can also be used. For example, U.S. Pat. Nos. 2,205,558, 3,394,195, and 3,407,204 disclose the use of maleimides; U.S. Pat. No. 3,562,157 discloses the use of malealdehyde; and U.S. Pat. No. 4,049,559 discloses the use of certain di-bicyclo or heptyl or di-bicyclo and heptenyl polyamines. These biocide additives are, however, usually too costly to be used economically. They can also cause plugging in the well if they are not thoroughly mixed in the floodwater. A critical problem with the use of these biocide additives relates to the fact that they tend to separate from the polymeric thickener as they advance through the formation and thus the effectiveness of the additive in protecting the thickener is reduced or lost. The reason for such separation is believed to be due to the fact that the rate of adherence to the rock in the formation for such biocide additives is different than for the polymeric thickeners and thus the rate of advance through the formation for each is different.

An additional problem with the use of many of the commercially available thickeners relates to providing a thickener that is stable and effective in environments characterized by temperatures of from about 15° C. to about 120° C. and above, high pressures (e.g., up to about 4000 psi), high concentrations of divalent or trivalent metal ions such as calcium, magnesium, boron, barium, iron, etc. (e.g., up to 3000 ppm or more and in some instances as high as 10,000 or 20,000 ppm), high salinity (e.g., total dissolved salts (TDS) levels of up to about 200,000 ppm), and low or high pH (e.g., pH as low as about 4 and as high as about 12). Some of these thickeners undergo a marked decrease in viscosity at relatively high temperatures and therefore are not sufficiently thermally stable for use in oil fields having relatively high temperatures. Many are also relatively difficult to inject, have a relatively low tolerance to divalent and/or trivalent metal ions, and/or have poor shear stability.

It would be advantageous to provide a polymeric thickener that would, in itself, be biologically resistant. By providing such a polymer, the problem of separation of the polymer from any biocide additive would be inherently overcome. It would also be advantageous if this thickener could be effectively used in waterflooding operations wherein the polymer would be exposed to high temperatures, high salinities, high pressures, high concentrations of divalent and/or trivalent metal ions, and/or high or low pH.

SUMMARY OF THE INVENTION

The present invention contemplates the provision of a water-soluble, biologically resistant polymer that is useful as a thickener in waterflooding operations. These polymeric thickeners are useful when exposed to temperatures of from about 15° C. to about 120° C. and above, high salinities, high pressures, high concentrations of divalent and/or trivalent metal ions, and high or low pH. These polymeric thickeners inherently overcome the problem of separation from additional biocide additives because the polymer, is in itself, bioresistant. The cost of these bioresistant polymers is significantly less than the cost of corresponding mixtures of polymeric thickeners and biocide additives because the relative level of use of the biocide monomer in forming these polymers is significantly less than the level of use with such mixtures.

Broadly stated, the present invention provides for a water-soluble, bioresistant polymer containing amide, maleimide and optionally acid or salt portions represented by the formula

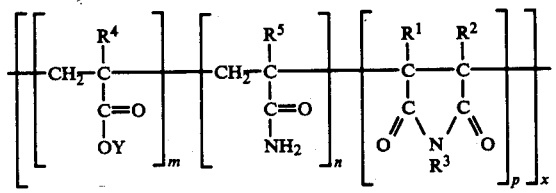

wherein: Y is hydrogen, ammonium, an alkali metal or an alkaline earth metal; $R^1$ and $R^2$ are independently hydrogen, hydroxyl, halogen or hydrocarbon-based groups of 1 to about 20 carbon atoms; $R^3$ is hydrogen or a hydrocarbon-based group of from 1 to about 12 carbon atoms; $R^4$ and $R^5$ are independently hydrogen or alkyl groups of 1 to about 3 carbon atoms; m is a number sufficient to provide the acid or salt portion of said polymer at a level of from zero to about 90% by weight of the total weight of said polymer; n is a number sufficient to provide the amide portion of said polymer at a level of from about 10% to about 99.5% by weight of the total weight of said polymer; p is a number sufficient to provide the maleimide portion of said polymer at a level of at least about 0.2% by weight of the total weight of said polymer; and x is a number sufficient to provide said polymer with a molecular weight of at least about 100,000.

The invention further provides for a method for recovering oil from a subterranean formation comprising injecting into said formation an aqueous composition comprising a thickening amount of the foregoing polymer.

DESCRIPTION OF THE PREFERRED EMBODIMENTS

The term "hydrocarbon-based", when used throughout this specification and in the appended claims, denotes organic groups having a predominantly hydrocarbon character within the context of the invention. Such groups include the following:

1. Hydrocarbon group that is, aliphatic, (e.g., alkyl or alkenyl), alicyclic (e.g., cycloalkyl or cycloalkenyl), aromatic, aliphatic- and alicyclic-substituted aromatic, aromatic-substituted aliphatic and alicyclic groups, and the like.

2. Substituted hydrocarbon groups containing non-hydrocarbon substituents which, in the context of this invention, do not alter the predominantly hydrocarbon character of the material. Those skilled in the art will be aware of suitable substituents; examples are:

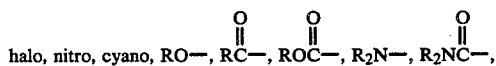

halo, nitro, cyano, RO—, RC—, ROC—, $R_2N$—, $R_2NC$—, (R being hydrogen or a hydrocarbon group).

3. Hetero groups that is, groups which, while predominantly hydrocarbon in character within the context of this invention, contain atoms other than carbon present in a chain or ring otherwise composed of carbon atoms. Suitable hetero atoms will be apparent to those skilled in the art and include, for example, oxygen and nitrogen.

In general, no more than about three substituents or hetero atoms, and preferably no more than one, will be present for each 10 carbon atoms in the hydrocarbon-based group.

The term "lower" as used in the present specification and claims, when used in conjunction with terms such as alkyl, alkenyl, alkoxy, alcohol, and the like, is intended to describe such groups or compounds which contain a total of up to 7 carbon atoms.

The water-soluble, bioresistant polymers that are provided in accordance with the invention are represented by the formula

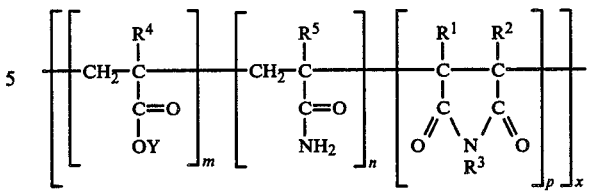

wherein Y is hydrogen, ammonium, an alkali metal or an alkaline earth metal; $R^1$ and $R^2$ are independently hydrogen, hydroxyl or hydrocarbon-based groups of 1 to about 20 carbon atoms; $R^3$ is hydrogen or a hydrocarbon-based group of from 1 to about 12 atoms; $R^4$ and $R^5$ are independently hydrogen or alkyl groups of 1 to about 3 carbon atoms; m is a number sufficient to provide the acid or salt portion of said polymer at a level of from zero to about 90% by weight of the total weight of said polymer, preferably from about 10% to about 50%, more preferably about 30%; n is a number sufficient to provide the amide portion of said polymer at a level of from about 10% to about 99.5% by weight of the total weight of said polymer, preferably from about 50% to about 90%, more preferably about 70%; p is a number sufficient to provide the maleimide portion of said polymer at a level of at least about 0.2% by weight of the total weight of said polymer, preferably from about 0.2% to about 20%, more preferably from about 0.5% to about 10%, more preferably from about 0.5% to about 2%, more preferably from about 0.5% to about 1%; and x is a number sufficient to provide said polymer with a molecular weight of at least about 100,000. Y is preferably an alkali metal, more preferably sodium. $R^1$ and $R^2$ can independently be halogen (e.g., chlorine, bromine, iodine, fluorine), amino, hydroxy, nitro, sulfo, phospho, carboxy, carboxyamido, alkyl (e.g., methyl, ethyl, propyl, butyl, amyl), aryl (e.g., phenyl), alkoxy (e.g., methoxy, ethoxy, propyloxy, butyloxy, amyloxy), aryloxy (e.g., phenoxy), and derivatives of the latter types which also may contain one or more of the same general class of substituents, for example, hydroxyalkoxy-alkyl such as hydroxyethoxy-ethyl. $R^3$ can be a substituted or unsubstituted alkyl, phenyl, hexahydrophenyl or benzyl group with those containing up to about 12 carbon atoms being preferred. $R^4$ and $R^5$ can be the same or different and preferably each is hydrogen. In a preferred embodiment, $R^1$, $R^2$, $R^4$ and $R^5$ are each hydrogen and $R^3$ is hydrogen or an alkyl or aryl group of up to about 10 carbon atoms. In another preferred embodiment $R^1$, $R^2$, $R^3$, $R^4$ and $R^5$ are each hydrogen. These compounds preferably have a molecular weight of at least about 1,000,000, more preferably from about 1,000,000 to about 10,000,000, more preferably from about 3,000,000 to about 7,000,000.

In a preferred embodiment, these polymers are copolymers derived from acrylamide and a maleimide (preferably maleimide), said copolymers having a number average molecular weight of at least about 100,000, preferably at least about 1,000,000, a maleimide content of from about 0.2% to about 20% by weight and an acrylamide content of from about 80% to about 99.8% by weight.

In another preferred embodiment, these polymers are terpolymers derived from acrylamide, an alkali metal (preferably sodium) acrylate and a maleimide (preferably maleimide), said terpolymer having a molecular weight of at least about 100,000, preferably at least about 1,000,000, a maleimide content of from about 0.2% to about 20% by weight, an acrylamide content of from about 10% to 99.8% by weight, and an alkali metal acrylate content of up to about 90% by weight.

The water-soluble, bioresistant polymers of the invention are preferably prepared by polymerizing the required maleimide monomer with the required amide monomer, or a mixture of the required amide monomer and acid or salt monomer. Polymerization preferably occurs by free radical polymerization of the monomers in water, although precipitation or inverse emulsion polymerization techniques can also be used. Free radical polymerization in water can be accomplished by charging the monomers and water to a suitable vessel, purging the system of residual oxygen with a stream of an inert gas such as nitrogen, followed by initiation with a free radical catalyst. The polymerization reaction is preferably conducted by raising the temperature of the reaction mixture to the decomposition temperature of the catalyst and allowing the polymerization to proceed to the desired conversion. Agitation may be employed to assist in heat transfer since the reaction is exothermic.

The catalyst can be any free radical catalyst suitable for making polyacrylamide, with the persulfates, peroxides, or azo catalysts being preferred. Catalysts that are particularly useful are the salts of persulfate such as ammonium, sodium, or potassium. These particular systems are capable of redox reactions to provide a wide range of operating temperatures. A preferred polymerization temperature is between about 0° C. and about 100° C. although temperatures of above about 40° C. are more preferred. Advantageously the polymerization temperature is in the range of about 60° C. to about 80° C.

The concentration of monomers in the water solutions is preferably in the range of about 1% to about 20% by weight. Higher concentrations can be used but the resulting product is usually in the form of a viscous, non-flowing gel which is inconvenient for further use. The choice of monomer concentration is usually determined by the desired viscosity characteristics of the ultimate product solution.

The ratio of maleimide monomer to amide monomer, or amide/acid (or salt derivative) monomer mixture is preferably at the concentration selected to provide the desired polymer product. However, since the maleimide monomers tend to polymerize only moderately well with the amide, and acid or salt monomers, a slight over charge of maleimide monomer is preferred to achieve the desired polymer.

The time of the reaction is dependent upon the rate of polymerization and the desired yield. The rate is determined by the choice of catalyst and the monomer concentration. Normally a high yield (90% or greater) is desired for commercial production and the time is chosen based on the above conditions and the capabilities of the equipment, especially as to heat removal. The polymerization is generally unaffected by pressure. Normally a slight over-pressure of the inert gas is employed to assure that atmospheric oxygen is constantly excluded from the reaction.

The resulting polymeric solution, which generally has a relatively high viscosity, may be utilized for enhanced oil recovery applications by merely diluting the solution with additional water to the desired concentration. Alternatively, the polymer may be recovered by precipitation with a suitable non-solvent such as acetone or a lower alcohol (e.g., methanol). In the latter case, the polymer is preferably shipped to the point of application in the form of a dry powder and then redissolved for use in the field. Since the polymers of the invention are bioresistant, no special treatment in the field is required other than insuring that the polymer is completely dissolved in the floodwater.

The amide monomers that are useful in preparing the polymers of the invention are represented by the formula

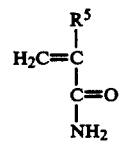

wherein $R^5$ is hydrogen or an alkyl group of 1 to about 3 carbon atoms. The amide monomer is preferably acrylamide or methacrylamide, with acrylamide being particularly preferred.

The acid or salt monomers that are useful are represented by the formula

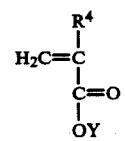

wherein $R^4$ is hydrogen or an alkyl group of 1 to about 3 carbon atoms; Y is hydrogen, ammonium, an alkali metal (e.g., sodium or potassium) or an alkaline earth metal (e.g., calcium or magnesium) salts. Sodium acrylate and sodium methacrylate are preferred.

The maleimide monomers that are useful in preparing the polymers of the invention are characterized by containing the 2,5-dioxo-delta$^3$-pyrroline nucleus, which may be represented by the formula:

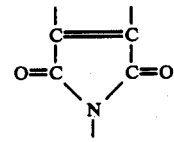

A preferred maleimide is that in which all of the free bonds of the formula are joined to hydrogen. The resulting compound is maleimide which may be represented by the formula:

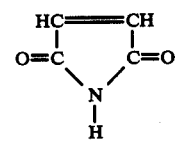

The hydrogen of the imide group may be replaced by a hydrocarbon-based group of 1 to about 12 carbon atoms, preferably unsubstituted or substituted alkyl, phenyl, hexahydrophenyl and benzyl groups. Derivatives also may be obtained by substitution of either or both of the hydrogen of the maleyl group. The substituents that are useful include halogen (e.g., chlorine, bromine, iodine, fluorine), amino, hydroxy, nitro, sulfo, phospho, carboxy, carboxyamide, alkyl (e.g., methyl, ethyl, propyl, butyl, amyl), aryl (e.g., phenyl), alkoxy (e.g., methoxy, ethoxy, propyloxy, butyloxy, amyloxy), aryloxy (e.g., phenoxy), and derivatives of the latter types which also may contain one or more of the same general class of substituents, for example, hydroxyalkoxy-alkyl such as hydroxyethoxy-ethyl.

Preferred maleimides include the maleimides of the general formula

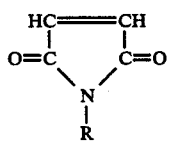

wherein R is hydrogen or an alkyl or aryl group containing up to about 10 carbon atoms.

Of the aromatic imides, those maleanils which contain in the aromatic residue in ortho position to the imidic nitrogen a substituent group of alkyl, alkoxy, halogen, hydroxy or carboxy can be used. Other substituents particularly in the remaining ortho position of the aromatic ring can also be present.

Examples of useful maleimides include: maleimide, 1,1'-(methylenedi-4,1-phenylene)bis maleimide, N-methyl-maleimide, N-ethyl-maleimide, N-n-propyl-maleimide, N-n-butyl-maleimide, N-n-butylcitraconimide, N-n-amyl-maleimide, N-n-hexyl-maleimide, N-n-octyl-maleimide, and the corresponding isobutyl, isoamyl, isohexyl, and isooctyl imides, N-benzyl-maleimide, N-(alpha-phenyl-ethyl)-maleimide, N-cyclohexyl-maleimide, 3-chloro-4-bromo-1-methyl-maleimide, 3,4-dibromo-1-ethyl-maleimide, N-(chloro-methyl)-maleimide, maleanil (N-phenyl-maleimide), 2'-methyl-maleanil (N-ortho-tolyl-maleimide), 4'-methyl-maleanil (N-para-tolyl-maleimide), 2',5'-di-methyl-maleanil, 2',4'-dimethyl-maleanil, 2'-chloro-maleanil, 3'-chloromaleanil, 2',5'-dichloro-maleanil, 4'-n-butyl-maleanil, 2'-methyl-3'-chloro-maleanil, 4'-tertiary-amyl-maleanil, 4'-hydroxy-maleanil, 4'-methoxy-maleanil, 4'-ethoxy-maleanil, citraconimide, N-ortho-tolyl-citraconimide, N-(4'-methoxy-3'-carboxy-phenyl)-citraconimide, pyrocinchonanil, N-3'-amino-pyrocinchonanil, N-quinolyl-maleimide, and N-n-butyl-pyrocinchonimide. Maleimide and 1,1'-(methylenedi-4,1-phenylene)bis maleimide are preferred.

The following examples are provided for the purpose of further illustrating the present invention. Unless otherwise indicated, in the following examples as well as throughout the specification and in the claims, all parts and percentages are by weight, and all temperatures are in degrees centigrade.

EXAMPLE 1

An 8-ounce polymerization bottle was charged with 6.5 grams of acrylamide, 3.5 grams of acrylic acid, 0.5 gram of maleimide, 90.0 grams of distilled water, and 1.0 ml. of 0.4% potassium persulfate solution. The pH was set at 8-10 by addition of NaOH. The polymerization bottle was purged with nitrogen gas, sealed and placed in a tumbling water bath having a temperature of 60° C. for 4 hours. An additional charge of 5 ml. of the above potassium persulfate solution was added to the reaction mixture and the reaction was continued for an additional 8 hours. The resulting product solution was added to an excess of methanol to precipitate a polymeric product. Purification to remove residual monomers was accomplished using soxhlet extraction for 24 hours using methanol as the extraction solvent. Filtration and vacuum drying followed. Carbon 13 NMR analysis of the polymeric product indicated an acrylamide content of 69.3% by weight, a sodium acrylate content of 22.1%, and a maleimide content of 8.6% by weight.

EXAMPLE 2

Example 1 was repeated with the exception that 1.0 gram of maleimide was employed in the reaction mixture rather than 0.5 gram. Carbon 13 NMR analysis of the polymer indicated an acrylamide content of 63.3% by weight, a sodium acrylate content of 23.0% and a maleimide content of 13.7% by weight.

EXAMPLE 3

An 8-ounce polymerization bottle was charged with 1.0 gram of acrylamide, 0.5 gram of maleimide, 90 grams of distilled water, and 1.0 ml. of 0.4% potassium persulfate solution. The polymerization bottle was purged with nitrogen gas, sealed and placed in a tumbling water bath having a temperature of 60° C. for 24 hours. The resulting product solution was added to an excess of methanol to precipitate a polymeric product. Purification to remove residual monomers was accomplished using soxhlet extraction for 24 hours using methanol as the extraction solvent. Filtration and vacuum drying followed. Carbon 13 NMR analysis of the polymeric product indicated a maleimide content of about 14% by weight of the total weight of the polymer.

EXAMPLE 4

Example 3 was repeated with the exception that 1.0 gram of maleimide was employed in the reaction mixture rather than 0.5 gram. Carbon 13 NMR analysis of the resulting polymer product indicated a maleimide content of about 14% by weight of the total weight of the polymer.

EXAMPLE 5

An 8-ounce polymerization bottle was charged with 13 grams of acrylamide, 7 grams of acrylic acid, 0.2 gram of maleimide, 180 grams of distilled water, and 4 ml. of 0.4% potassium persulfate solution. The pH was set at 8-9 by addition of NaOH. The polymerization bottle was purged with nitrogen gas, sealed and placed in a tumbling water bath having a temperature of 60° C. for 18 hours. The resulting product solution was added to an excess of methanol to precipitate a polymeric product. Purification to remove residual monomers was accomplished using soxhlet extraction for 24 hours using methanol as the extraction solvent. Filtration and vacuum drying followed. Carbon 13 NMR analysis of the polymeric product indicated an acrylamide content of 51.0% by weight, a sodium acrylate content of 48.5%, and a maleimide content of 0.5% by weight.

EXAMPLE 6

Example 5 was repeated with the exception that 0.4 gram of maleimide was employed in the reaction mixture rather than 0.2 gram. Carbon 13 NMR analysis of the polymer indicated an acrylamide content of 49.2% by weight, a sodium acrylate, content of 49.9% and a maleimide content of 0.9% by weight.

EXAMPLE 7

Example 5 was repeated with the exception that 0.6 gram of maleimide was employed in the reaction mixture rather than 0.2 gram. Carbon 13 NMR analysis of the polymer indicated an acrylamide content of 48.7% by weight, a sodium acrylate content of 50.0% and a maleimide content of 1.3% by weight.

EXAMPLE 8

An 8-ounce polymerization bottle was charged with 24.75 grams of acrylamide, 5.25 grams of acrylic acid, 0.75 gram of N-methyl maleimide, 270 grams of distilled water, and 6 ml. of 0.4% potassium persulfate solution. The pH was set at 9 by addition of NaOH. The polymerization bottle was purged with nitrogen gas, sealed and placed in a tumbling water bath having a temperature of 60° C. for 17 hours. The resulting product solution was added to an excess of isopropanol to precipitate a polymeric product. Purification to remove residual monomers was accomplished using soxhlet extraction for 24 hours using methanol as the extraction solvent. Filtration and vacuum drying followed The polymer product had an intrinsic viscosity of 1.07 in 1N. NaNO$_3$ at 30° C. 1200 ppm solutions of the polymer had viscosities (25° C. @ 10 sec$^{-1}$) of 2.1 cps. in distilled water, 1.3 in 1% NaCl solution and 1.3 in sea water (3.66% salinity).

EXAMPLE 9

An 8-ounce polymerization bottle was charged with 17 grams of acrylamide, 0.1 gram of N-phenyl maleimide, 3 grams of acrylic acid, 180 grams of distilled water, and 2.0 ml. of 0.4% sodium persulfate solution. The pH was set at 9 by the addition of NaOH. The polymerization bottle was purged with nitrogen gas, sealed and placed in a tumbling water bath having a temperature of 60° C. for 6 hours. The resulting product solution was added to an excess of acetone in a Waring Blender to precipitate a polymeric product. The polymers were filtered and dried. Purification to remove residual monomers was accomplished by three extractions in acetone of 24 hours each. Filtration and vacuum drying followed. Carbon 13 NMR analysis of the polymeric product indicated an N-phenyl maleimide content of 1.07% by weight of the total weight of the polymer. The polymer product had an intrinsic viscosity of 8.4 in 1N. NaNO$_3$ at 30° C. 1200 ppm solutions of the polymer had viscosities (25° C. @ 10 sec$^{-1}$) of 37.3 cps. in distilled water, 4.8 cps. in 1% NaCl solution and 3.2 cps. in sea water (3.66% salinity).

EXAMPLE 10

Example 9 was repeated with the exception that 0.2 gram of N-phenyl maleimide was employed in the reaction mixture rather than 0.1 gram. Carbon 13 NMR analysis of the resulting polymer product indicated an N-phenyl maleimide content of 1.17% by weight of the total weight of the polymer. The polymer product had an intrinsic viscosity of 7.3 in 1N. NaNO$_3$ at 30° C. 1200 ppm solutions of the polymer had viscosities (25° C. @ 10 sec$^{-1}$) of 29.5 cps. in distilled water, 3.7 cps. in 1% NaCl solution and 3.4 cps. in sea water (3.66% salinity).

EXAMPLE 11

Example 9 was repeated with the exception that 0.5 gram of N-phenyl maleimide was employed in the reaction mixture rather than 0.1 gram. Carbon 13 NMR analysis of the resulting polymer product indicated a maleimide content of about 1.92% by weight of the total weight of the polymer. The polymer product had an intrinsic viscosity of 3.9 in 1N. NaNO$_3$ at 30° C. 1200 ppm solutions of the polymer had viscosities (25° C. @ 10 sec$^{-1}$) of 8.3 cps. in distilled water, 2.8 cps. in 1% NaCl solution and 2.3 cps. in sea water (3.66% salinity).

EXAMPLE 12

An 8-ounce polymerization bottle was charged with 3.0 gram of acrylamide, 0.3 gram of N-phenyl maleimide, 270 grams of distilled water, and 3.0 ml. of 0.4% sodium persulfate solution. The polymerization bottle was purged with nitrogen gas, sealed and placed in a tumbling water bath having a temperature of 60° C. for 6 hours. The resulting product solution was added to an excess of acetone in a Waring Blender to precipitate a polymeric product. The polymer was filtered and dried. Purification to remove residual monomers was accomplished by three extractions in acetone of 24 hours each. Filtration and vacuum drying followed. Carbon 13 NMR analysis of the polymeric product indicated an N-phenyl maleimide content of 1.33% by weight of the total weight of the polymer. The polymer product had an intrinsic viscosity of 6.3 in 1N. NaNO$_3$ at 30° C. 1200 ppm solutions of the polymer had viscosities (25° C. @ 10 sec$^{-1}$) of 3.4 cps. in distilled water, 3.8 cps. in 1% NaCl solution and 3.8 cps. in sea water (3.66% salinity).

EXAMPLE 13

Example 12 was repeated with the exception that 0.75 gram of N-phenyl maleimide was employed in the reaction mixture rather than 0.3 gram. Carbon 13 NMR analysis of the resulting polymer product indicated an N-phenyl maleimide content of 2.53% by weight of the total weight of the polymer. The polymer product had an intrinsic viscosity of 4.5 in 1N. NaNO$_3$ at 30° C. 1200 ppm solutions of the polymer had viscosities (25° C. @ 10 sec$^{-1}$) of 2.7 cps. in distilled water, 2.6 cps. in 1% NaCl solution and 3.0 cps. in sea water (3.66% salinity).

EXAMPLE 14

Example 12 was repeated with the exception that 1.5 gram of N-phenyl maleimide was employed in the reaction mixture rather than 0.3 gram. Carbon 13 NMR analysis of the resulting polymer product indicated an N-phenyl maleimide content of 5.32% by weight of the total weight of the polymer. The polymer product had an intrinsic viscosity of 3.0 in 1N. NaNO$_3$ at 30° C. 1200 ppm solutions of the polymer had viscosities (25° C. @ 10 sec$^{-1}$) of 2.3 cps. in distilled water, 2.7 cps. in 1% NaCl solution and 2.3 cps. in sea water (3.66% salinity).

EXAMPLE 15

Example 12 was repeated with the exception that 0.15 gram of N-phenyl maleimide was employed in the reaction mixture rather than 0.3 gram. Carbon 13 NMR analysis of the resulting polymer product indicated an N-phenyl maleimide content of 0.98% by weight of the total weight of the polymer. The polymer product had an intrinsic viscosity of 3.0 in 1N. NaNO$_3$ at 30° C. 1200 ppm solutions of the polymer had viscosities (25° C. @ 10 sec$^{-1}$) of 2.3 cps. in distilled water, 2.7 cps. in 1% NaCl solution and 2.3 cps. in sea water (3.66% salinity).

The polymers from Examples 1–6 and 8–15 were subjected to a microbiological screen using five strains of bacteria capable of growing aerobically and/or anaerobically. The strains that were used are indicated in Table I.

TABLE I

| Organism | Isolation Site |
|---|---|
| Bacillus sp. | Produced water |
| Enterobacter sp. | Produced water |
| Pseudomonas sp. (I) | Polymer contaminant |
| Pseudomonas sp. (II) | Polymer contaminant |
| Pseudomonas sp. (III) | Produced water |

The organisms Bacillus sp., Enterobacter sp., and Pseudomonas sp. (III) were isolated from an oil field. The other two organisms were laboratory isolated bacteria known to grow on water-soluble polymers. Bacillus sp. was gram positive while the others were gram negative. All strains were grown aerobically in nutrient broth at 30° C. for 24 hours. After incubation, the bacteria were washed three times by centrifugation (5,000×g, 5° C., 10 min.) with sterile distilled water. The washed cells were resuspended in minimal sterile distilled water. Cell counts were done on each cell suspension using a Petroff-Housser counting chamber.

Media were prepared for these experiments in two parts. Polymer solutions were made in distilled water at concentrations of 2400 ppm and pH 7.0. All solutions were stirred for 24 hours, weighted before sterilized, and then autoclaved (sterilized) for one hour at 121° C. and 15 psi. All water lost due to autoclaving was returned by adding sterile distilled water until the polymer solutions reached their original weight.

Basal salts medium containing 0.12% yeast extract, 0.2% $KH_2PO_4$, 0.2% $K_2HPO_4$, 0.1% $(NH_4)_2SO_4$, and 0.01% $CaCl_2.H_2O$ in distilled water at pH 7.0. The $CaCl_2.H_2O$ was prepared as a separate stock solution and added to the salts solution after both were sterilized and cooled to room temperature. The different polymer media for these experiments were made by aseptically mixing 1:1 (by volume) solutions of basal salts medium and 2400 ppm polymer solution.

Fifty ml. aliquots of polymer media were aseptically transferred to clear, sterile 150 ml. erlenmeyer flasks. Each flask (except controls) was inoculated to a concentration of $10^3$ bacteria/ml. with the appropriate cell suspension. Controls were inoculated with equivalent volumes of sterile distilled water. All flasks were incubated at 30° C. for 14 days, 30 days or 45 days as indicated below. Aerobic incubation included rotary shaking of the flasks at 200 rpm. Anaerobic incubation was carried out in an anaerobic chamber system. Controls were incubated aerobically. Optical observations for turbidity of the incubated samples was used to determine "growth" and "no growth" of the bacteria.

The test results are indicated in Tables II to VI. Tables II–IV provide test results wherein the incubation period was 14 days. Table V covers tests for incubation periods of 30 days. Table VI covers tests wherein the incubation period was 45 days. The data clearly indicates that with one exception, the polymers of the invention do not support bacterial growth. The one exception is indicated in Tables IV-VI wherein it is indicated that growth of Enterobacter sp. was detected on the polymers of Examples 9-15 under aerobic conditions.

TABLE II

| Organism | Condition | Product of Example 1 | Product of Example 2 |
|---|---|---|---|
| Enterobacter sp. | A | — | — |
| Enterobacter sp. | AN | — | — |
| Bacillus sp. | A | — | — |
| Bacillus sp. | AN | — | — |
| Pseudomonas sp. (II) | A | — | — |
| Pseudomonas sp. (II) | AN | — | — |

Key:
A = aerobic; AN = anaerobic; + = bacterial growth detected; — = bacterial growth not detected.

TABLE III

| Organisms | Cond. | Control* No. 1 | Control** No. 2 | 3 | 4 | 5 | 6 | 8 |
|---|---|---|---|---|---|---|---|---|
| Control (none) | A | — | — | — | — | — | — | — |
| Control (none) | AN | — | — | — | — | — | — | — |
| Enterobacter sp. | A | + | + | — | — | — | — | — |
| Enterobacter sp. | AN | + | + | — | — | — | — | — |
| Bacillus sp. | A | + | + | — | — | — | — | — |
| Bacillus sp. | AN | + | + | — | — | — | — | — |
| Pseudomonas sp. (II) | A | + | + | — | — | — | — | — |
| Pseudomonas sp. (II) | AN | + | + | — | — | — | — | — |
| Pseudomonas sp. (III) | A | + | + | — | — | — | — | — |
| Pseudomonas sp. (III) | AN | + | + | — | — | — | — | — |
| Pseudomonas sp. (I) | A | + | + | — | — | — | — | — |
| Pseudomonas sp. (I) | A | + | + | — | — | — | — | — |

*Unhydrolyzed polyacrylamide having a molecular weight of $3.5 \times 10^6$.
**Dow Pusher 500, a product of Dow Chemical identified as a partially carboxylated polyacrylamide.

TABLE IV

| Organisms | Cond. | 9 | 10 | 11 | 12 | 13 | 14 | 15 |
|---|---|---|---|---|---|---|---|---|
| Control (none) | A | — | — | — | — | — | — | — |
| Control (none) | AN | — | — | — | — | — | — | — |
| Enterobacter sp. | A | + | + | + | + | + | + | + |
| Enterobacter sp. | AN | + | + | — | — | — | — | — |
| Bacillus sp. | A | + | + | — | — | — | — | — |
| Bacillus sp. | AN | + | + | — | — | — | — | — |
| Pseudomonas sp. (II) | A | + | + | — | — | — | — | — |
| Pseudomonas sp. (II) | AN | + | + | — | — | — | — | — |
| Pseudomonas sp. (III) | A | + | + | — | — | — | — | — |
| Pseudomonas sp. (III) | AN | + | + | — | — | — | — | — |
| Pseudomonas sp. (I) | A | + | + | — | — | — | — | — |
| Pseudomonas sp. (I) | A | + | + | — | — | — | — | — |

TABLE V

| Organisms | Cond. | 9 | 10 | 11 | 12 | 13 | 14 | 15 |
|---|---|---|---|---|---|---|---|---|
| Control (none) | A | − | − | − | − | − | − | − |
| Control (none) | AN | − | − | − | − | − | − | − |
| Enterobacter sp. | A | + | + | + | + | + | + | + |
| Enterobacter sp. | AN | + | + | − | − | − | − | − |
| Bacillus sp. | A | + | + | − | − | − | − | − |
| Bacillus sp. | AN | + | + | − | − | − | − | − |
| Pseudomonas sp. (II) | A | + | + | − | − | − | − | − |
| Pseudomonas sp. (II) | AN | + | + | − | − | − | − | − |
| Pseudomonas sp. (III) | A | + | + | − | − | − | − | − |
| Pseudomonas sp. (III) | AN | + | + | − | − | − | − | − |
| Pseudomonas sp. (I) | A | + | + | − | − | − | − | − |
| Pseudomonas sp. (I) | A | + | + | − | − | − | − | − |

TABLE VI

| Organisms | Cond. | 9 | 10 | 11 | 12 | 13 | 14 | 15 |
|---|---|---|---|---|---|---|---|---|
| Control (none) | A | − | − | − | − | − | − | − |
| Control (none) | AN | − | − | − | − | − | − | − |
| Enterobacter sp. | A | + | + | + | + | + | + | + |
| Enterobacter sp. | AN | + | + | − | − | − | − | − |
| Bacillus sp. | A | + | + | − | − | − | − | − |
| Bacillus sp. | AN | + | + | − | − | − | − | − |
| Pseudomonas sp. (II) | A | + | + | − | − | − | − | − |
| Pseudomonas sp. (II) | AN | + | + | − | − | − | − | − |
| Pseudomonas sp. (III) | A | + | + | − | − | − | − | − |
| Pseudomonas sp. (III) | AN | + | + | − | − | − | − | − |
| Pseudomonas sp. (I) | A | + | + | − | − | − | − | − |
| Pseudomonas sp. (I) | A | + | + | − | − | − | − | − |

The method of the present invention may be carried out utilizing injection and production systems as defined by any suitable arrangement of wells. One well arrangement commonly used in waterflooding operations and suitable for use in carrying out the method of the present invention is an integrated five-spot pattern of the type illustrated in U.S. Pat. No. 3,927,716 which is incorporated herein by reference. Other well arrangements may be used in carrying out the present invention, examples of some of which are also disclosed in the foregoing '716 patent.

The term "pore volume" is used herein to mean that volume of the portion of the formation underlying the well pattern employed, as described in greater detail in the '716 patent.

In a preferred embodiment of the invention, an aqueous composition containing a minor thickening amount of the bioresistant polymer of the invention is injected into a subterranean formation through one or more injection wells to drive the oil in the formation toward one or more production wells. The injection of such aqueous composition and the recovery of oil from the production wells can be accomplished using standard techniques well known to those skilled in the art. The concentration of polymeric thickener in such aqueous composition is preferably from about 0.05% to about 0.2% by weight, more preferably about from 0.05% to about 0.1% by weight. Preferably, the concentration of thickener in such aqueous composition is sufficient to provide the aqueous composition with a viscosity of about equal to or greater than the viscosity of the oil in the reservoir. The injected aqueous composition preferably has a pore volume of about 0.6 to about 3 or higher.

In another preferred embodiment, a surfactant slug, buffer slug and aqueous flooding medium are injected into the subterranean formation in sequential order through one or more injection wells to drive the oil in the formation toward one or more production wells. Again the injection and recovery techniques are standard techniques well known to those skilled in the art. The surfactant slug is an aqueous system containing preferably about 0.001% to about 5% by weight, more preferably about 0.1% to about 1% by weight of a suitable surfactant, and, optionally, about 0.05% to about 0.2% by weight, preferably about 0.05% to about 0.1% by weight of the thickener of the invention. The size of the surfactant slug preferably ranges from about 0.2 to about 3 pore volumes.

The concentration of surfactant in the surfactant slug is preferably adjusted in accordance with the size of the slug. A surfactant slug with a pore volume of about 0.2 preferably has a surfactant concentration of about 1 to about 2% by weight. A surfactant slug with a pore volume of about 1 preferably has a surfactant concentration of about 0.1 to about 1% by weight. A surfactant slug with a pore volume of about 2 preferably has a surfactant concentration of about 0.05 to about 0.5% by weight.

The surfactant preferably is selected from among those surfactants having a high tolerance to high levels of aqueous phase salinity as well as divalent and trivalent metal ions such as calcium, magnesium, boron, barium, iron and the like to permit the use of the water employed to be a high salinity brine such as sea water. Examples of surfactants that can be used under various advantageous conditions include the petroleum sulfonates; nonionic surfactants, such as polyethoxylated alkyl phenols, polyethoxylated aliphatic alcohols, carboxylic esters, carboxylic amides, and polyoxyethylene fatty acid amides; combinations of anionic and nonionic surfactants such as alkyl or alkylaryl sulfonates or phosphates and polyethoxylated alkyl phenols or sulfates; cationic surfactants such as quaternary ammonium salts, and derivatives of fatty amines and polyamines; and amphoteric surfactants such as the quaternary ammonium sulfonates and carboxylates and the sulfonium sulfonates. Many such surfactants are known in the art. See, for example, "Chemicals for Oil Field Operations, Recent Developments", Edited by J. I. DiStasio, Noyes Data Corporation, Park Ridge, N.J. (1981) at pages 156–197 which along with the patents cited therein are incorporated herein by reference.

The buffer slug comprises an aqueous composition containing the polymeric thickener of the invention. It has a thickener concentration of about 0.05% to about 0.2% by weight, preferably about 0.05 to about 0.1% by weight. Preferably, the concentration of such thickener in the buffer slug is at least about 0.02% by weight higher than the concentration of thickener, if any, in the surfactant slug. The higher concentration of thickener in the buffer slug in relation to the concentration of thickener, if any, in the surfactant slug is essential to insure proper control of the relative mobilities of the surfactant slug and the buffer slug. The buffer slug preferably has a pore volume in the range of about 0.6 to about 3.

The drive fluid or aqueous flooding medium is injected into the reservoir in sequential order after the surfactant slug and buffer slug. This flooding medium is preferably water and can be any source of water, such as sea water, that is readily available.

An advantage of the present invention is that because of the superior properties of the bioresistant polymers of the invention, the inventive method can be practiced in subterranean formations having relatively high temperatures and high pressures, and can employ floodwaters characterized by high salinities, high concentrations of divalent and trivalent metal ions, and either high or low pH. These conditions are encountered under various circumstances at Prudhoe Bay, the North Sea, the Persian Gulf, the Gulf of Mexico, as well as other major oil fields. The bioresistant polymers of the invention provide the advantage that the addition of biocide additives for preventing the deterioration of the polymer are not required, thus problems inherent with the use of such biocide additives such as plugging of the well and separation of the polymer and additive can be avoided.

While the invention has been explained in relation to its preferred embodiments, it is to be understood that various modifications thereof will become apparent to those skilled in the art upon reading this specification. Therefore, it is to be understood that the invention disclosed herein is intended to cover such modifications as fall within the scope of the appended claims.

We claim:

1. A method for recovering oil from a subterranean formation comprising injecting into said formation through one or more injection wells an aqueous composition comprising a thickening amount of a water-soluble polymeric thickener represented by the formula

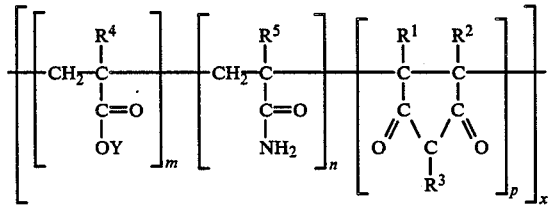

wherein

Y is hydrogen, ammonium, an alkali metal or an alkaline earth metal, $R^1$ and $R^2$ are independently hydrogen, hydroxyl, halogen, amino, nitro, sulfo, phospho, carboxy, carboxyamido groups or hydrocarbon groups of 1 to about 20 carbon atoms, $R^3$ is hydrogen or a hydrocarbon group of from 1 to about 12 carbon atoms, $R^4$ and $R^5$ are independently hydrogen or alkyl groups of 1 to about 3 carbon atoms;

m is a number sufficient to provide the acid or salt portion of said polymer at a level of from zero to about 90% by weight of the total weight of said polymer, n is a number sufficient to provide the amide portion of said polymer at a level of from about 10% to about 99.5% by weight of the total weight of said polymer, p is a number sufficient to provide the maleimide portion of said polymer at a level of at least about 0.2% by weight of the total weight of said polymer, and x is a number sufficient to provide said polymer with a molecular weight of at least about 100,000; and driving oil in said formation toward one or more production wells.

2. The method of claim 1 wherein said aqueous composition comprises a buffer slug, said method further comprising the steps of:

injecting into said formation a surfactant slug to precede said buffer slug, said surfactant slug comprising an aqueous solution containing an effective amount of a surface-active agent to reduce the oil-water interfacial tension and/or alter the wettability characteristics of the rock in said formation, and injecting into said formation an aqueous flooding medium to follow said buffer slug.

3. The method of claim 1 wherein said polymeric thickener is present in said aqueous composition at a concentration in the range of about 0.05 to about 0.2% by weight.

4. The method of claim 1 wherein the average temperature of the oil in said formation is in the range of about 15° C. to about 120° C.

5. The method of claim 1 wherein the water in said aqueous composition has a TDS of up to about 200,000 ppm.

6. The method of claim 1 wherein said aqueous composition has a divalent or trivalent metal ion concentration of up to about 20,000 ppm.

7. The method of claim 1 wherein the pH of said aqueous composition is in the range of about 4 to about 12.

8. The method of claim 1 wherein the water in said aqueous composition is sea water.

9. The method of claim 1 wherein the pressure within said formation ranges up to about 4000 psi.

10. The method of claim 2 wherein the amount of said surfactant slug injected into said formation is equal to about 0.2 to about 3 pore volumes.

11. The method of claim 2 wherein the amount of said buffer slug injected into said formation is equal to about 0.6 to about 3 pore volumes.

12. The method of claim 2 wherein said surfactant slug contains a thickening amount of the polymeric thickener in said buffer slug, the amount of said thickener in said buffer slug exceeding the amount of said thickener in said surfactant slug by at least about 0.02% by weight.

13. The method of claim 1 wherein Y is an alkali metal.

14. The method of claim 1 wherein Y is sodium.

15. The method of claim 1 wherein $R^1$, $R^2$, $R^3$, $R^4$ and $R^5$ are each hydrogen.

16. The method of claim 1 wherein $R^1$, $R^2$, $R^4$ and $R^5$ are each hydrogen and $R^3$ is an alkyl or aryl group of up to about 10 carbon atoms.

17. The method of claim 1 wherein m is a number sufficient to provide the acid or salt portion of said polymeric thickener at a level of from about 10% to about 50% by weight of the total weight of said polymeric thickener.

18. The method of claim 1 wherein n is a number sufficient to provide the amide portion of said polymeric thickener at a level of from about 50% to about 90% by weight of the total weight of said polymeric thickener.

19. The method of claim 1 wherein p is a number sufficient to provide the maleimide portion of said polymeric thickener at a level of from about 0.2% to about 20% by weight of the total weight of said polymeric thickener.

20. The method of claim 1 wherein m is a number sufficient to provide the acid or salt portion of said polymeric thickener at a level of about 30% by weight of the total weight of said polymeric thickener.

21. The method of claim 1 wherein n is a number sufficient to provide the amide portion of said polymeric thickener at a level of about 70% by weight of the total weight of said polymeric thickener.

22. The method of claim 1 wherein p is a number sufficient to provide the maleimide portion of said polymeric thickener at a level of from about 0.5% to about 10% by weight of the total weight of said polymeric thickener.

23. The method of claim 1 wherein p is a number sufficient to provide the maleimide portion of said polymeric thickener at a level of from about 0.5% to about 2% by weight of the total weight of said polymeric thickener.

24. The method of claim 1 wherein p is a number sufficient to provide the maleimide portion of said polymeric thickener at a level of from about 0.5% to about 1% by weight of the total weight of said polymeric thickener.

25. The method of claim 1 wherein the portion of said polymeric thickener represented by the formula

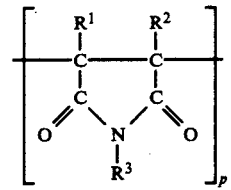

is derived from maleimide or 1,1'-(methylenedi-4,1-phenylene)bis maleimide.

26. The method of claim 1 wherein x is a number sufficient to provide said polymer with a molecular weight of at least about 1,000,000.

27. A method for recovering oil from a subterranean formation comprising injecting into said formation a thickening amount of a water-soluble polymeric thickener, said polymeric thickener comprising a copolymer derived from monomers consisting of acrylamide and maleimide, said copolymer having a molecular weight of at least about 100,000, a maleimide content of from about 0.2% to about 20% by weight of the total weight of said copolymer, and an acrylamide content of from about 80% to about 99.8% by weight of the total weight of said copolymer, and driving oil in said formation toward one or more production wells.

28. The method of claim 27 wherein said copolymer has a molecular weight of at least about 1,000,000.

29. A method for recovering oil from a subterranean formation comprising injecting into said formation an aqueous composition comprising a thickening amount of a water-soluble polymeric thickener, said polymeric thickener comprising a terpolymer derived from acrylamide, an alkali metal acrylate and a maleimide, said terpolymer having molecular weight of at least about 100,000, a maleimide content of from about 0.2% to about 20% by weight of the total weight of said terpolymer, an acrylamide content of from about 10% to about 99.8% by weight of the total weight of said terpolymer, and an alkali metal acrylate content of up to about 90% by weight of the total weight of said terpolymer, and driving oil in said formation toward one or more production wells.

30. The method of claim 29 wherein said alkali metal acrylate is a sodium acrylate.

31. The method of claim 29 wherein said terpolymer has a molecular weight of at least about 1,000,000.

* * * * *